CHOPPER MODULATED ELECTRIC MOTOR SERVO AMPLIFIER

Filed June 27, 1951 2 Sheets-Sheet 1

INVENTOR.
Robert M. Byrne
BY
[signature]
ATTORNEY

CHOPPER MODULATED ELECTRIC MOTOR SERVO AMPLIFIER

Filed June 27, 1951

2 Sheets-Sheet 2

INVENTOR.
Robert M. Byrne
BY
A. H. Oldham
ATTORNEY

United States Patent Office 2,707,255

Patented Apr. 26, 1955

2,707,255

CHOPPER MODULATED ELECTRIC MOTOR SERVO AMPLIFIER

Robert M. Byrne, Akron, Ohio, assignor to Goodyear Aircraft Corporation, Akron, Ohio, a corporation of Delaware Application June 27, 1951, Serial No. 233,871

4 Claims. (Cl. 318—28)

This invention relates to a direct coupled servo type amplifier and, more particularly, is concerned with an improved chopper modulated servo amplifier which generates an output signal proportional to a D. C. or low frequency A. C. input signal.

While chopper modulated servo amplifiers have been heretofore proposed in the prior art, common practice has been to couple the modulator to the amplifier input by either transformer or capacity coupling. The transformer coupling introduces objectionable phase shift over the range of frequency of the input signal, resulting in reduced torque in the servomotor. Also, the transformer coupling is relatively expensive. The capacity coupling is open to the objection that a sudden increase in the amplitude of the input signal drives the input grid positive and blocks the amplifier until the charge on the condenser can be dissipated.

It is the general object of this invention to avoid and overcome the foregoing and other difficulties in and objections to the prior art practices by the provision of a chopper modulated servo amplifier which is less complicated, more efficient, more accurate, faster in response, and less expensive.

Another object of this invention is the provision of an error-detector and amplifier for a D. C. servo system in which the error detector is in the form of a chopper modulator which compares the input signal to the output signal of the servo amplifier at a synchronous rate.

Another object of this invention is to provide coupling between the modulator and amplifier which gives negligible phase shift over the range of frequency determined by the input signal frequency added to or subtracted from the modulator frequency.

Another object of this invention is the provision of a chopper modulator which is directly coupled to the input of the amplifier, the amplifier being of a differential type for amplifying the difference voltage between the input and output signals.

These and other objects of the invention which will become apparent as the description proceeds are achieved by the provision of a servo amplifier for generating an output signal proportional to an input signal and including a two-phase servomotor, one phase of which is connected to a constant A. C. source. The servomotor mechanically drives a precision potentiometer which is connected across a D. C. potential source. A chopper modulator, including a double-throw single-pole switch driven by a vibrator synchronized with the frequency of the A. C. source, is provided, the pole of the switch being connected to the wiper contact of the potentiometer. A pair of resistors are connected in series across the contacts of the switch, and the D. C. input signal is connected to the common junction of the two resistors. The grids of a differential amplifier are connected directly across the resistors to the switch contacts. The output of the differential amplifier drives a push-pull power amplifier, the plate load of which is the other phase winding of the servomotor.

For a better understanding of the invention, reference should be had to the accompanying drawings, wherein.

Figure 1:
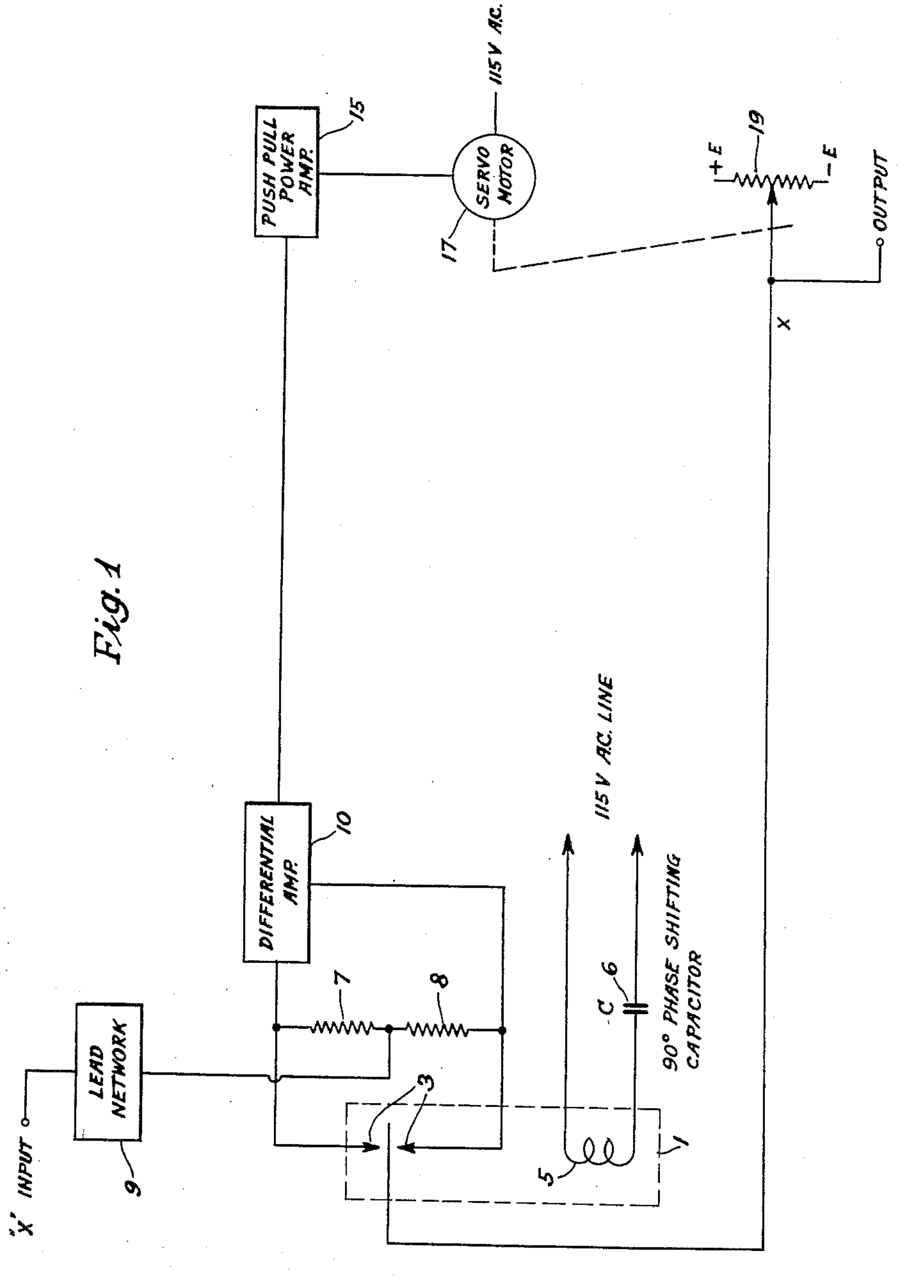
Fig. 1 is a block diagram of the servo system.
Figure 2:
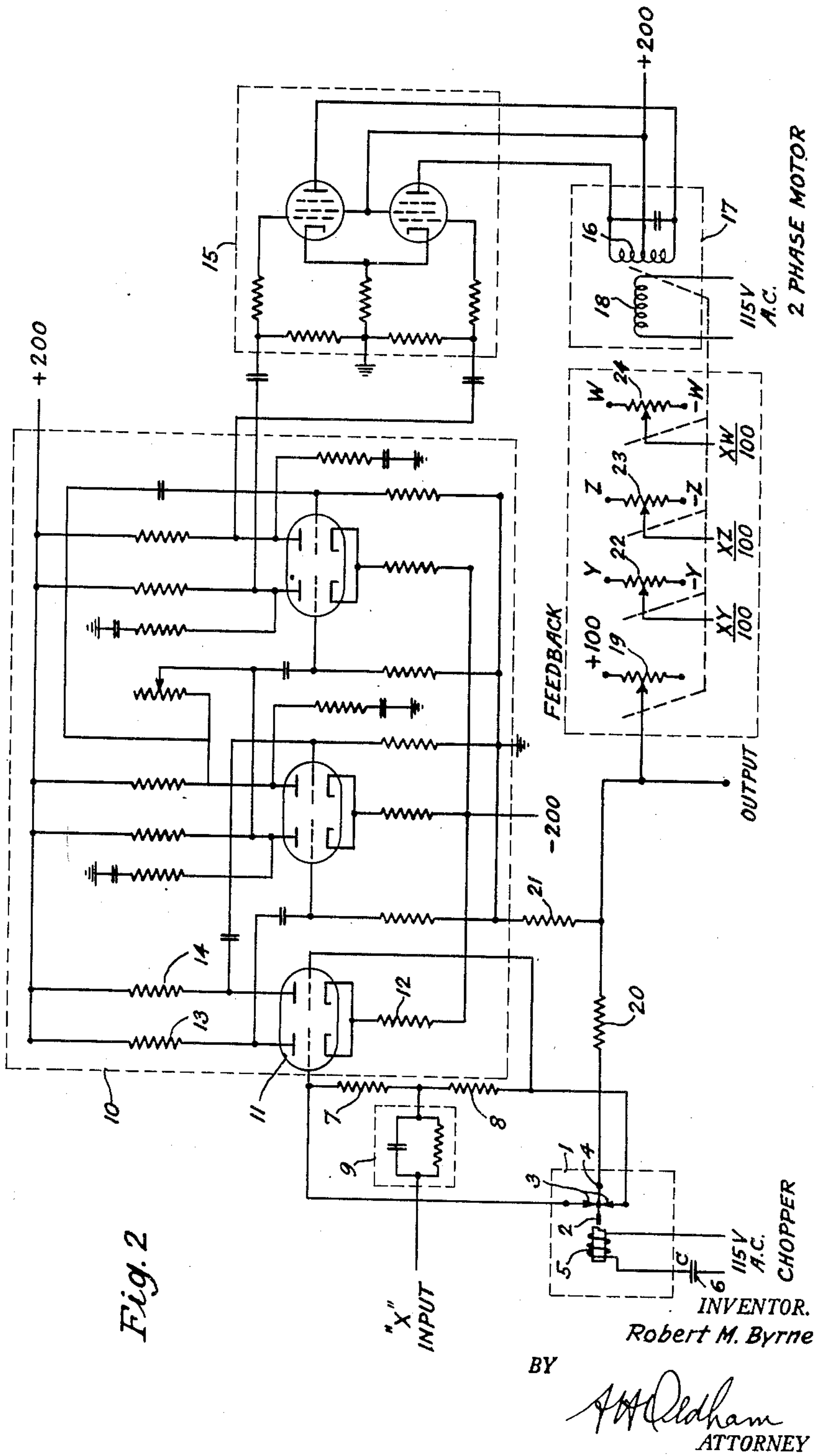
Fig. 2 is a wiring diagram of the complete embodiment of the invention.

With specific reference to the form of the invention illustrated in the drawings, the numeral 1 indicates generally the chopper modulator which includes a vibrator

2 serving as a contact arm of a single-pole double-throw switch having contacts 3 and a pole 4. The vibrator 2 is driven at a frequency of 60 cycles per second and synchronized with the A. C. line voltage by a coil 5. The chopper modulator is of a precision type in common usage in the art. A condenser 6 is provided in the energizing circuit of the coil 5 to shift the phase of the vibrator 90 degrees with the line voltage.

Contacts 3 are connected across a pair of input resistors 7 and 8 which are preferably of equal resistance value. The input signal is connected to the common junction of the resistors 7 and 8 through a lead network 9 which is provided to partially compensate for inertia effects of the mechanical parts of the servo system. Such a network is normally used to improve the over-all frequency characteristics of the system.

The contacts 3 are connected directly to the input grid of the first stage of a differential amplifier 10. The differential amplifier is of conventional design, each stage including a dual triode having a common cathode resistor 12 and separate plate load resistors 13 and 14. The plate load resistors are connected to a positive D. C. potential of preferably 200 volts and the cathode resistor 12 is connected to a negative D. C. potential source of preferably minus 200 volts. One or more additional stages may be provided as shown, the grids of the successive stages being capacity coupled to the plate of the previous stage. The plates of the last stage of the differential amplifier 10 are coupled to the grids of a push-pull power amplifier indicated generally at 15. The power amplifier 15 is of conventional design and utilizes one phase winding 16 of a two-phase servomotor 17 as the plate load. The phase winding 16 has a center tap connected to the D. C. plate voltage supply. The other phase winding 18 of the servo-motor 17 is connected to the A. C. line voltage source.

The servomotor is mechanically coupled to a precision potentiometer 19 which is connected across a D. C. potential source (not shown) making the voltage at the ends of the potentiometer 19 at substantially ±100 volts D. C. with respect to ground. The wiper contact of the potentiometer 19 is connected to a current limiting resistor 20 to the pole 4 of the chopper modulator 6 and also tied to grounds through a large resistor 21.

In operation, an error signal is developed across the resistors 7 and 8 equal to the difference between the instantaneous input potential and the output potential of the wiper contact of the potentiometer 19. As a result of the chopper modulator 1, the grids of the differential amplifiers receive an alternating signal, the amplitude of which is determined by the potential difference betwen the output signal and the input signal and the phase of which is determined by the relative polarity of the output signal and the input signal. These alternating signals are amplified by successive stages of the differential amplifier, the power amplifier 15, and applied to the phase-winding 16 through the power amplifier 15. The condenser 6 shifts the phase of the chopper modulator 90 degrees from the line voltage so that the alternating signal across the phase winding 16 of the servomotor 17 is 90 degrees out of phase with the winding 18 and is either leading or lagging, depending on the relative polarity between the output potential at the wiper contact of the potentiometer 19 and the input potential at the junction of the resistors 7 and 8. The direction of rotation of the servomotor 17 is such that the wiper contact of potentiometer 19 is shifted in a direction to reduce the potential difference between the output and input to zero. The torque developed by the servomotor 17 increases with the amplitude of the alternating signal applied to the phase winding 16 so that the greater the error between the output potential and input potential of the servo amplifier, the larger the corrective torque supplied to reduce this error to zero.

It will be appreciated that a number of potentiometers may be ganged together to produce a plurality of output signals which are functionally related to the input signals. Such potentiometers are indicated at 22, 23, and 24. While the ratio of the output voltage at the wiper contact of the potentiometer 19 is always one-to-one with respect to the input signal, by varying the potential across the other potentiometers 22, 23, and 24, any ratio between the input signal and the output signal derived from the wiping contacts of these potentiometers can be attained.

From the above description, it will be clear that the objects of the invention have been achieved by the provision of a chopper modulator and amplifier combination which is directly coupled, resulting in a less expensive servo system and one that is less complicated, and faster in response. The error voltage applied to the control phase of the servomotor is always 90 degrees out of phase with the line voltage and does not shift with the amplitude of the error between the output and input signals.

While certain representative embodiments and details have been shown for the purpose of illustrating the invention, it will be apparent to those skilled in this art that various changes and modifications may be made therein without departing from the spirit or scope of the invention.

I claim:

1. A servo amplifier for generating an output signal proportional to an input signal including a two-phase servomotor, one phase of which is connected to a constant A. C. source, at least one potentiometer, the wiper contact of which is driven by the servomotor, the potentiometer being connected across a D. C. potential source, a double-throw single pole switch, a vibrator synchronized with the frequency of the A. C. source but 90° out of phase therewith, the vibrator actuating the switch, the pole of the switch being connected to the wiper contact of said potentiometer, a pair of resistors in series connected across contacts of said switch, the input signal being connected to the common junction of the two resistors, a differential amplifier having at least one stage of amplification connected across the contacts of the switch, a push-pull power amplifier being connected across the output of said differential amplifier, the other phase of the servomotor being connected as a plate load of the power amplifier, and an output connection to the wiper arm of the potentiometer.

2. A servo amplifier for generating an output signal proportional to an input signal including a two-phase servomotor, one phase of which is connected to a constant A. C. source but 90° out of phase therewith, at least one potentiometer, the wiper contact of which is driven by the servomotor, the potentiometer being connected across a D. C. potential source, a chopper modulator, a pair of resistors in series, the chopper modulator alternately connecting the output signal from the wiper contact of the potentiometer to opposite ends of the series resistors, the input signal being connected to the common junction of the two resistors, a differential amplifier having at least one stage of amplification connected across the contacts of the switch, a push-pull power amplifier being connected across the output of said differential amplifier, the other phase of the servomotor being connected as a plate load of the power amplifier, and an output connection to the wiper arm of the potentiometer.

3. A servo amplifier for generating an output signal proportional to an input signal including a two-phase servomotor, one phase of which is connected to a constant A. C. source, at least one potentiometer, the wiper contact of which is driven by the servomotor, the potentiometer being connected across a D. C. potential source, a chopper modulator, a pair of resistors in series, the chopper modulator alternately connecting the output signal from the wiper contact of the potentiometer to opposite ends of the series resistors, the chopper modulator being 90° out of phase with aforesaid constant A. C. source the input signal being connected to the common junction of the two resistors, amplifying means directly coupled across said series resistors for amplifying the difference voltage developed alternately across said resistors, the output of said amplifying means being connected to the other phase of said servomotor, and an output connection to the wiper arm of the potentiometer.

4. A servo amplifier for generating an output signal proportional to an input signal including a two-phase servomotor, one phase of which is connected to a constant A. C. source, at least one potentiometer, the wiper contact of which is driven by the servomotor, the potentiometer being connected across a D. C. potential source, a double-throw single pole switch, a vibrator synchronized with the frequency of the A. C. source but 90° out of phase therewith, the vibrator actuating the switch, the pole of the switch being connected to the wiper contact of said potentiometer, a pair of resistors in series connected across contacts of said switch, the input signal being connected to the common junction of the two resistors, amplifying means directly coupled across said series resistors for amplifying the difference voltage developed alternately across said resistors, the output of said amplifying means being connected to the other phase of said servomotor, and an output connection to the wiper arm of the potentiometer.

References Cited in the file of this patent

UNITED STATES PATENTS

| | | |
|---|---|---|
| 2,061,410 | Stablein | Nov. 17, 1936 |
| 2,484,134 | Wald | Oct. 11, 1949 |
| 2,574,656 | Peterson | Nov. 13, 1951 |
| 2,583,339 | Mouzon | Jan. 22, 1952 |
| 2,584,954 | Williams | Feb. 5, 1952 |

OTHER REFERENCES

"Theory of Servomechanisms" James, Nichols, Phillips, McGraw-Hill Book Company, Inc., 1947, pp. 108, 109.

Publication, "Electronic Industries," May, 1943, pp. 68, 69 and 153.